United States Patent
Cohen

(10) Patent No.: US 7,502,804 B2
(45) Date of Patent: Mar. 10, 2009

(54) METHOD OF CANDIDATE SELECTION USING AN ORGANIZATION-SPECIFIC JOB PROFILE

(75) Inventor: Emanuel Cohen, Jerusalem (IL)

(73) Assignee: HRVision Ltd., Jerusalem (IL)

( * ) Notice: Subject to any disclaimer, the term of this patent is extended or adjusted under 35 U.S.C. 154(b) by 103 days.

(21) Appl. No.: 10/598,219

(22) PCT Filed: Mar. 17, 2005

(86) PCT No.: PCT/IL2005/000313

§ 371 (c)(1),
(2), (4) Date: Aug. 22, 2006

(87) PCT Pub. No.: WO2005/086591

PCT Pub. Date: Sep. 22, 2005

(65) Prior Publication Data

US 2007/0143167 A1     Jun. 21, 2007

Related U.S. Application Data

(60) Provisional application No. 60/553,601, filed on Mar. 17, 2004.

(51) Int. Cl.
*G06F 17/30*    (2006.01)

(52) U.S. Cl. .......................... 707/101; 707/100; 707/1; 707/102; 707/104.1

(58) Field of Classification Search ...................... 707/1, 707/3, 100–104; 705/11
See application file for complete search history.

(56) References Cited

U.S. PATENT DOCUMENTS

| | | | |
|---|---|---|---|
| 5,862,223 A * | 1/1999 | Walker et al. | 705/50 |
| 6,289,340 B1 * | 9/2001 | Puram et al. | 707/5 |
| 6,430,559 B1 * | 8/2002 | Zhai | 707/5 |
| 2004/0030566 A1 * | 2/2004 | Brooks Rix | 705/1 |

* cited by examiner

*Primary Examiner*—Cam-Linh Nguyen
(74) *Attorney, Agent, or Firm*—Mark M. Friedman

(57) ABSTRACT

A method and system for selecting a candidate for a work position using performance data from each worker in a pool of existing workers, the method including the steps of: (a) inputting into a computer-implemented processing stage, for each worker in the pool of existing workers: (i) a Personal Profile (step 1) relating to a set of Personal Parameters, and (ii) a Performance Profile (step 2), (b) processing the Personal Profile and the Performance Profile of each of the existing workers, so as to produce a Set of Candidate Rules (step 3), wherein at least one candidate rule of the Set of Candidate Rules is a non-linear rule; (c) obtaining, for at least one candidate, a Personal Profile (step 5), and (d) analyzing the Personal Profile from the candidate (step 6), along with the Set of Candidate Rules, to produce a Computed Performance Rating for the candidate (step 7).

20 Claims, 5 Drawing Sheets

PERFORMANCE PROFILE

METHOD OF CANDIDATE SELECTION USING AN ORGANIZATION-SPECIFIC JOB PROFILE

FIELD AND BACKGROUND OF THE INVENTION

The present invention relates in general to the field of resource management and, more particularly, an assessment method used to select a suitable candidate, typically from a large pool of candidates, for a particular position in an organization.

In various known, prevalent assessment methods, candidates are tested for general or pre-determined abilities. The candidate attaining the best test score is considered to be the best candidate. The test may be a written (pen and paper) test or a computerized test.

More sophisticated and expensive methods are performed by assessment centers, which in addition to the above test, conduct a personal interview and provide a professional opinion with respect to each candidate.

Conventional methods of resource planning further include manually searching a personnel base to match appropriately qualified candidates to the technical resource requirements of the organization. Such technical resource requirements can include, for example, a pool of personnel that have the technical skills needed to meet the needs of the organization. After candidates are matched to these needs, deficiencies in other skills may remain. Because conventional methods do not effectively compare the abilities and characteristics of the candidates to the customer's needs, the service provider may have personnel assigned to a customer who are lacking essential skills to perform the service required by the customer.

Moreover, these methods fail to consider, in any comprehensive and scientific manner, the different standards and requirements of particular organizations, differences that may significantly lower predictions of a 'standard' assessment.

U.S. Pat. No. 6,289,340 to Puram, et al., teaches the selection of a candidate from a pool of candidates to fill a position based on the skills held by the candidate, the skills desired for the position and the priority of the skills for the position. Pre-defined lists of skills are used to develop detailed profiles of the candidates and the positions to be filled for better matching. To compare and rank candidates, adjusted skills scores are used which are limited by the priority of the skill for the position, yielding best-fit matches.

Once a sub-pool of satisfactory size is identified, the next task is to determine which of the adequate candidates has skills and experience that most closely match what is needed or desired for a position. For each skill, the candidate's score is compared to the maximum score needed by the employer. If the candidate's score exceeds the maximum score requested for a skill, then the system generates an adjusted score for that candidate for that skill that equals the maximum scored needed by the employer. If the candidate's score does not exceed the maximum score for that skill, then the adjusted score for that skill equals the actual score. The adjusted score is stored; the candidate's actual score is not over-written and remains in the storage medium database. Preferably, the adjusted scores are stored only temporarily as candidates are evaluated for a particular position. Each candidate's adjusted skill scores are added together to yield a total that is used to compare the candidates. This information is provided to the employer who then selects a candidate for the position or job.

In spite of numerous candidate screening and testing techniques on the market that provide a general, descriptive assessment of a candidate, to date, there is no facile, accurate way to cross-reference between those screening and testing results, and the specific environment (i.e., the organization), where the candidate is intended for employment. Inter alia, this is due to the fact that human nature is too complex for a simple assessment analysis to achieve high levels of predictive ability in this area.

Research of pre-employment screening techniques shows that, in most cases, it is difficult to reach validity levels of 0.5 or more, through the utilization of combinations of all known techniques [see F. Schmidt, et al., "The Validity and Utility of Selection Methods in Personnel Psychology: Practical and Theoretical Implications of 85 Years of Research Findings", Psychological Bulletin, 124, 262-274 (1998)]. Individual techniques of the prior art typically have validity levels of only 0.2-0.3.

There is therefore a recognized need for, and it would be highly advantageous to have, an assessment method for selecting a suitable candidate for a particular position in an organization that is straightforward, largely automatic, and attains extremely-high levels of predictive ability both in absolute terms and with respect to the predictive ability of assessment methods known in the art.

SUMMARY OF THE INVENTION

The present invention is an assessment method used to select a suitable candidate, typically from a large pool of candidates, for a particular position in an organization.

According to the teachings of the present invention there is provided an assessment method for selecting at least one suitable candidate for a work position using performance data from each worker in a pool of existing workers, the method including the steps of: (a) inputting into a computer-implemented processing stage, for each worker in the pool of existing workers: (i) a Personal Profile relating to a set of Personal Parameters, and (ii) a Performance Profile, (b) processing the Personal Profile and the Performance Profile of each of the existing workers, so as to produce a Set of Candidate Rules, wherein at least one candidate rule of the Set of Candidate Rules is a non-linear rule; (c) obtaining, for at least one candidate, a Personal Profile, and (d) analyzing the Personal Profile from the at least one candidate, along with the Set of Candidate Rules, to produce a Computed Performance Rating for the candidate.

According to another aspect of the present invention there is provided a system for selecting at least one suitable candidate for a work position using performance data from each worker in a pool of existing workers, the system including: (a) a processor; (b) a memory, associated with said processor, said memory including a data storage area, and (c) an input/output unit, operatively connected to said processor, wherein said processor, said memory, and said input/output unit are configured to: (i) input into a computer-implemented processing stage, for each worker in the pool of existing workers: (A) a Personal Profile relating to a set of Personal Parameters, and (B) a Performance Profile, (ii) process said Personal Profile and said Performance Profile of each of the existing workers, so as to produce a Set of Candidate Rules, wherein at least one candidate rule of said Set of Candidate Rules is a non-linear rule; (iii) obtain, for at least one candidate, a Personal Profile, and (iv) analyze said Personal Profile from said at least one candidate, along with said Set of Candidate Rules, to produce a Computed Performance Rating for said candidate.

According to further features in the described preferred embodiments, the Performance Profile is a Position-Specific Performance Profile.

According to still further features in the described preferred embodiments, the number of the existing workers in the pool is at least 20, more preferably, at least 30, and most preferably, at least 40.

According to still further features in the described preferred embodiments, the method further includes the step of: (e) comparing the Computed Performance Rating for the candidate with the Performance Profile for each worker in the pool of existing workers.

According to still further features in the described preferred embodiments, the method further includes the step of: (f) determining a closest match between a particular candidate and a particular worker of the existing workers in the pool, based on step (e) above.

According to still further features in the described preferred embodiments, the at least one candidate is a plurality of candidates, the method further including the step of: (e) ranking the plurality of candidates according to each respective Computed Performance Rating of the candidates, and wherein the Set of Candidate Rules is based on the Position-Specific Performance Profile.

According to still further features in the described preferred embodiments, the Personal Profile for the at least one candidate is a subset (i.e., less than the full set) of the Personal Profile for each worker in the pool.

According to still further features in the described preferred embodiments, the set of Personal Parameters for the at least one candidate is obtained by reducing the set of Personal Parameters for each worker in the pool, based on the Set of Candidate Rules.

According to still further features in the described preferred embodiments, the method further includes: (e) eliminating at least one parameter from the set of Personal Parameters for each worker, based on the Set Of Candidate Rules, to produce a streamlined set of Personal Parameters, and at least one eliminated parameter, and (f) testing the at least one candidate using test parameters from the set of Personal Parameters for each worker, the test parameters solely including the streamlined set.

According to still further features in the described preferred embodiments, the processing is reduced by inputting at least one rule of a human expert.

According to still further features in the described preferred embodiments, the method further includes: (e) performing an Employer's Evaluation for each of the existing workers in the pool, according to pre-determined criteria, to produce the Performance Profile for each of the existing workers.

According to still further features in the described preferred embodiments, the existing workers occupy a plurality of work positions, the Performance Profile is a plurality of Position-Specific Performance Profiles, and the Set of Candidate Rules is a plurality of Sets of Candidate Rules, each Set of the Sets relating to a particular work position of the work positions.

According to still further features in the described preferred embodiments, the Computed Performance Rating for the candidate is a plurality of Computed Performance Ratings, each of the plurality of Computed Performance Ratings being derived from one Set of the Sets.

According to still further features in the described preferred embodiments, the candidate is one of the existing workers in the pool.

According to still further features in the described preferred embodiments, the Performance Profile includes a rating for a Personal Chemistry Dimension.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
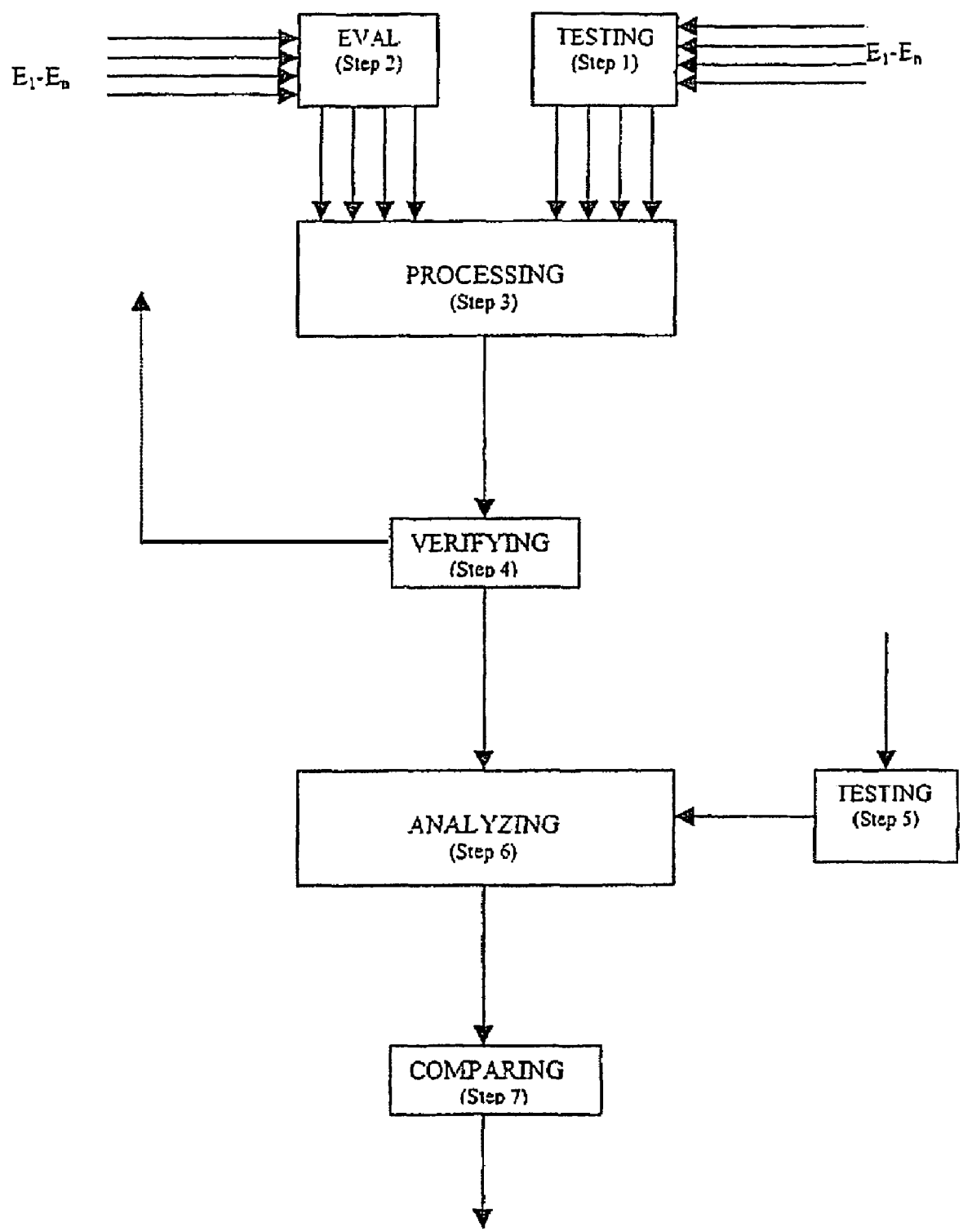
FIG. 1 is a schematic flowsheet of the assessment method of the present invention.

The present invention is an assessment method used to select a suitable candidate, typically from a large pool of candidates, for a particular position in an organization.

The invention seeks to overcome one of the predominant difficulties in hiring new employees: the lack of ability to cross-match the right personality and abilities of a candidate, with the requirements demanded by a specific organization and a specific position, and subsequently predict the (relative) suitability of one or more candidates.

The principles and operation of the assessment method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

The invention offers a computerized method, for producing a set of candidate rules for analyzing one or more candidates using optimization techniques. The method defines the relationship between (a) the abilities and characteristics ("personal parameters") of current employees, and
(b) the success (performance level) of these current employees in the organization.

This set of rules has a characteristically-high validity level, because it relates complex relationships between personal parameters and job performance (success) to be determined mathematically. Many of these relationships are not intuitive, or even counter-intuitive. Indeed, a particular personal parameter, in and of itself, may not be advantageous or disadvantageous. Only when couple with one or more other personal parameters does the relationship between the particular personal parameter and job performance become evident.

The inventor has further discovered that developing a set of candidate rules establishes a firm basis for matching managers and subordinates, e.g., in large-scale organizations abundant with line-managers. This set of rules determines who, among the existing or potential employees, would best match the requirements and management style of each particular manager.

The preferred embodiments described herein are best understood with reference to the following definition of terms:

Personal Parameters—an ability/characteristic of a person (examples: visual memory, friendliness, stress tolerance, years of work experience, etc.).

Personal Test—a test for examining one or more Personal Parameters (e.g., personality traits, analytical abilities, integrity).

Personal Profile—a grade or rating given to the employee or candidate, following a Personal Test, for one or more Personal Parameters.

Dimension of Performance—a criterion (usually one of several Dimensions/criteria) by which the employer measures the employee, in the job framework the employee is currently performing (examples: productivity, customer service).

Employer's Evaluation ("EVAL")—A rating given to each employee, by the employer, which reflects the performance of the employee, with respect to particular Dimensions of Performance, and with respect to a certain job.

Set of Candidate Rules—A set of rules for predicting the suitability (or potential EVAL) of a candidate, the rules being determined by processing EVALs and Personal Profiles. A Set of Candidate Rules is specific to a particular job, and usually, to a particular organization, and is characterized by high validity levels.

Computed Performance Rating—The rating given to a candidate, based on the Candidate Rules. Again, the Computed Performance Rating is specific to a particular job, and usually, to a particular organization. For an existing employee, the Computed Performance Rating for that employee can be compared to the actual EVAL or Performance Profile of the employee.

Referring now to the figures, FIG. 1 is a schematic flowsheet of the assessment method of the present invention. By way of example, a large employing organization has 100 identical positions filled by employees (e.g., bank tellers). The company seeks to hire an additional four candidates to fill four new (identical) positions.

In Step 1, the group of 100 existing employees ($E_1$ to $E_n$), or more typically, a statistically-significant sample thereof, undergoes a Personal Test, in which various Personal Parameters are tested or recorded. Preferably, the Personal Test should include as many Personal Parameters as possible, particularly those that are known to influence Dimensions of Performance.

The result of Step 1 is a Personal Profile for each existing employee in the sample. Exemplary profiles of three employees: John Smith, Patricia Brooks, and Ann Gillmor, are provided in Table 1.

TABLE 1

Personal Profiles for Employees

| | Personal Parameter | | | |
|---|---|---|---|---|
| Employee | Visual Memory | Knowledge | Assertiveness | Stress Tolerance |
| John Smith | 68 | 91 | 46 | 88 |
| Patricia Brooks | 55 | 66 | 78 | 78 |
| Ann Gillmor | 91 | 92 | 45 | 55 |

In Step 2, the same group (or sample) of existing employees $E_1$ to $E_n$, undergoes an Employer's Evaluation ("EVAL"), for one or more Dimensions of Performance ("DIMP"). The EVAL should reflect as accurately as possible, the success of the employee in each specific Dimension of Performance.

The result of Step 2 is a list of EVALs for each tested employee. The EVALs of the three exemplary employees are provided in Table 2.

TABLE 2

EVALs for Employees

| | EVAL | | |
|---|---|---|---|
| Employee | Overall Performance | Teamwork | Customer Satisfaction |
| John Smith | 71 | 66 | 76 |
| Patricia Brooks | 45 | 95 | 71 |
| Ann Gillmor | 81 | 63 | 55 |

In Step 3, a computerized optimization program processes the data input from Steps 1 and 2, and searches for a strong positive correlation between each Personal Parameter in the Personal Profile and the EVAL for each DIMP for each of the employees (in the sample). The result of Step 3 is a Set of Candidate Rules for the particular job in question. Typically, the Set of Candidate Rules is constructed from only certain Personal Parameters derived from the Personal Test. In other words, some of the Personal Parameters are found to have no or little statistical contribution to the EVAL, and are thus not included in the Set of Candidate Rules.

The computerized processing is preferably at least partially-based on an "Expert System" approach, i.e., using human knowledge to improve the processing in Step 3 and the Set of Candidate Rules resulting therefrom. Some predefined rules eliminate the need to go over all combinations (which can reach a very high number), and should serve as input to the computerized program. These rules are often related to most common combinations of Personal Parameters, such that irrelevant combinations can be ignored.

Preferably, the validity level of the Set of Candidate Rules is calculated, and the sufficiency of the validity level is evaluated (Step 4). In addition to standard validity level verification, an additional verification is performed, by a series of eliminations, each time subtracting a particular employee from the employees in the sample, and checking the EVAL of that employee against the Computed Performance Rating "predicted" by the Set of Candidate Rules without the input data from that particular employee. If the validity level of this "worst-case scenario" is sufficient (typically above 0.5), then the Set of Candidate Rules produced is validated.

If the validity level is insufficient, the following operations could be taken:

(a) review the EVALs, to ascertain their accuracy, and/or (b) increase the number of employees in the sample.

Thus, prior to evaluating candidates, the assessment method of the present invention has produced a Set of Candidate Rules that is specific for the job at hand, and a Computed Performance Rating for each of the employees in the sample.

In Step 5, new candidates undergo a Personal Test, which may be identical to the Personal Test of the employees in the sample. However, after formulating the job-specific Set of Candidate Rules, it is almost always possible to reduce the Personal Test so as to cover those Personal Parameters that are needed for the Set of Candidate Rules. The result of Step 5 is a Personal Profile for one or more candidates.

Subsequently, these Personal Profiles, along with the job-specific Set of Candidate Rules are subjected to computerized processing and analysis (Step 6). Each candidate receives a Computed Performance Rating, which is the job-specific rating given to the particular candidate, with respect to that specific job within the organization.

Moreover, by comparing the Computed Performance Rating of a particular candidate with the Computed Performance Ratings of (existing) employees in the sample (Step 7), the organization can identify the employee(s) to whom the candidate's job performance will be most similar.

These two pieces of information, i.e.:

(1) the job-specific rating given to a particular candidate, with respect to that specific job within the organization, and (2) identification of the employee to whom the candidate's job performance will be most similar, dramatically improve the abilities of the employers to identify the optimal candidates for their own organization and for a particular job, and resolve many prevalent problems regarding mistaken assessment of candidates.

Preferably, the computerized processing and analysis performed in Step 6 can also be utilized to rank a plurality of candidates according to their respective Computed Performance Ratings.

Figure 2:
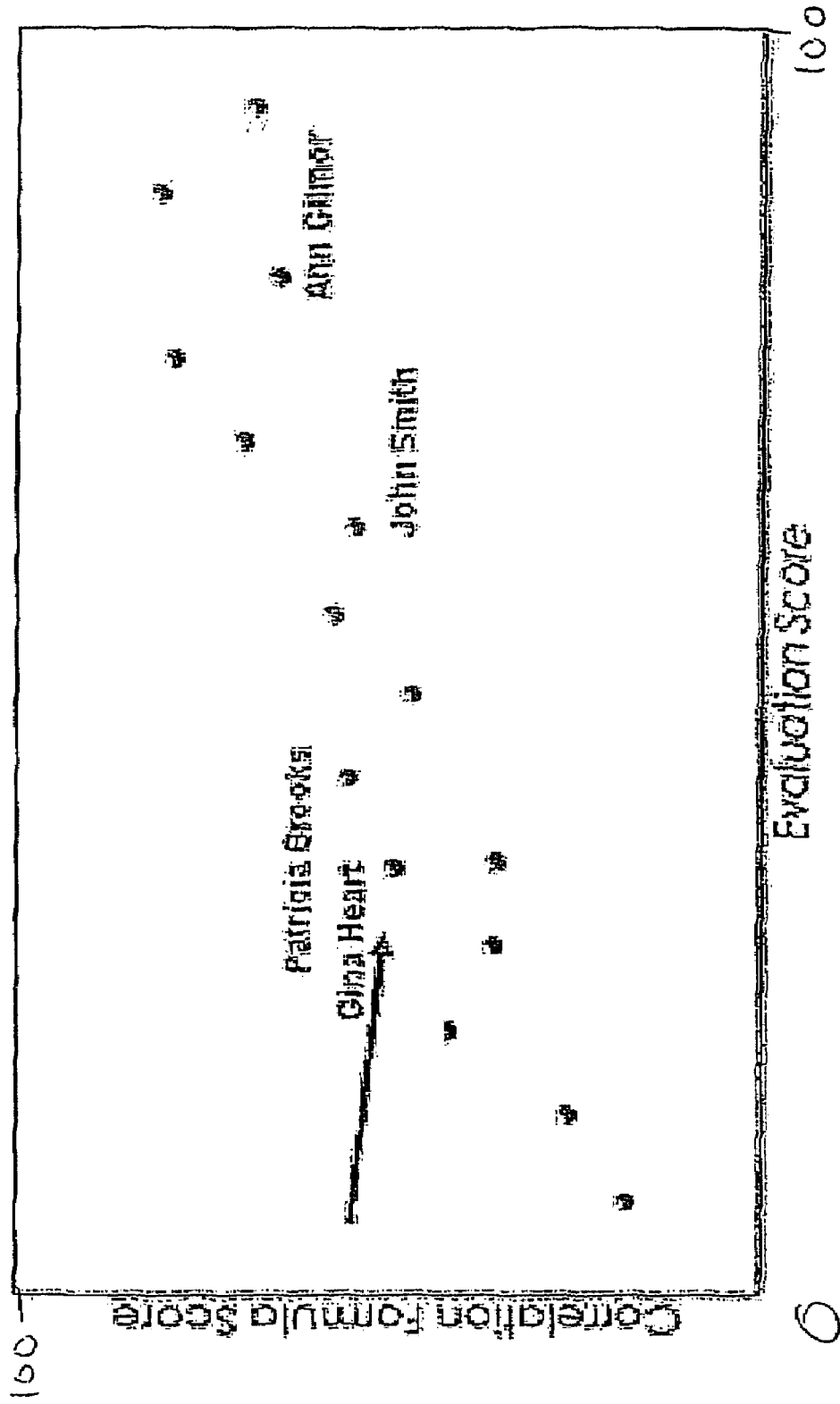
FIG. 2 is an exemplary plot showing the Computed Performance Rating vs. the Performance Profile, according to the present invention.

FIG. 2 is a plot showing the Computed Performance Rating vs. the Performance Profile for the three exemplary employees, John Smith, Patricia Brooks, and Ann Gillmor. Regarding the candidate, Gina Heart, it is evident from the plot that the performance of Gina Heart will be most similar to that of Patricia Brooks.

Organizations sometimes wish to fill more than one job position. Alternatively, organizations seek to reposition existing employees into other jobs, so as to improve the performance of those employees within the organization. In the present invention, this need is addressed by obtaining the requisite information in Steps 1 and 2 to generate a plurality of Sets of Candidate Rules, one Set of Candidate Rules for each specific position. Subsequently, in Step 6, the Personal Profiles for the one or more candidates (obtained in Step 5) are subjected to computerized processing and analysis along with each individual Set of Candidate Rules. Each candidate receives a Computed Performance Rating for each specific job position within the organization. The organization can then decide which position is the most appropriate for each particular candidate.

Figure 3:
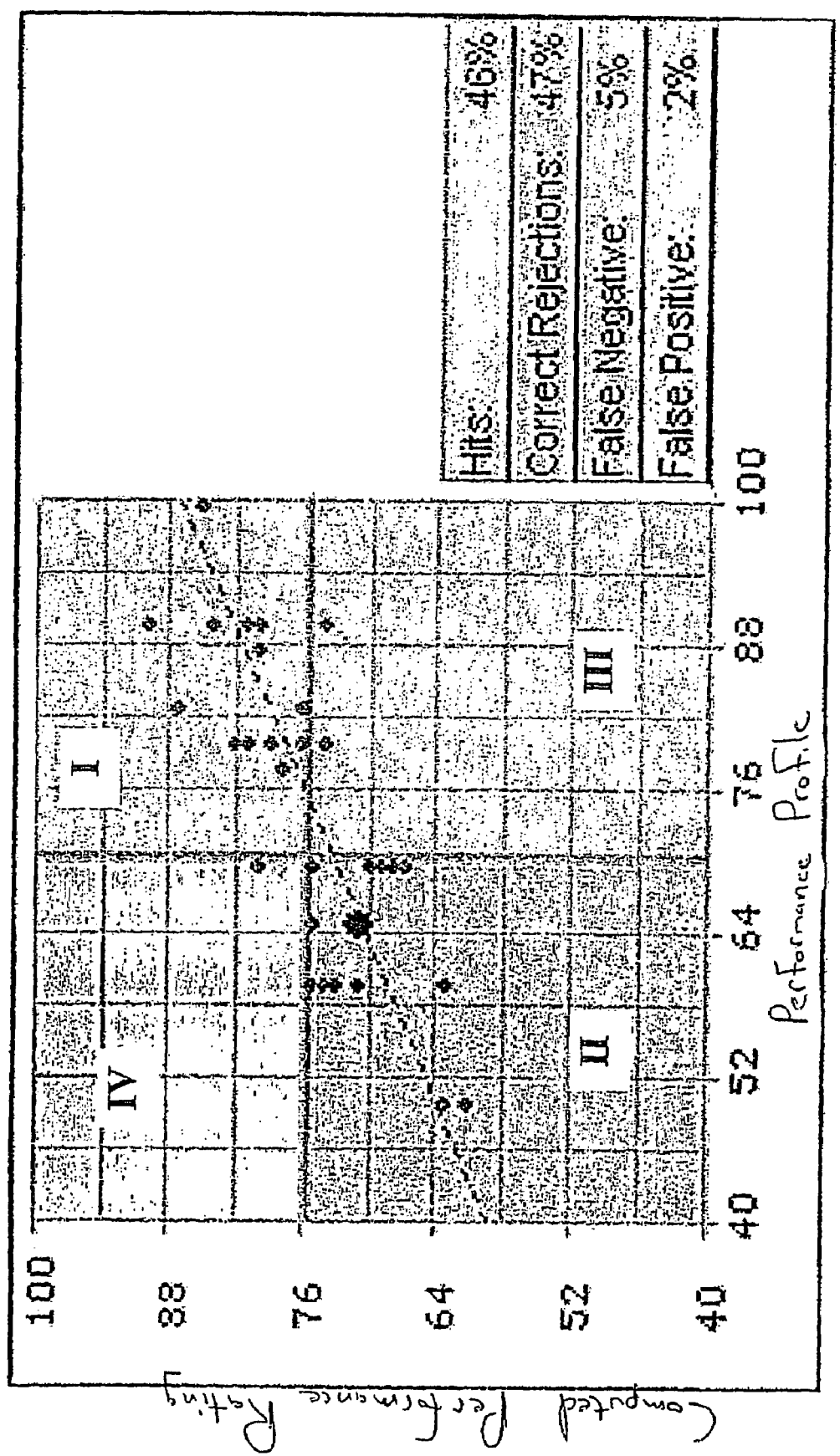
FIG. 3 is an exemplary plot showing the Computed Performance Rating vs. the Performance Profile, the plot defining four quadrants—"hits", "correct rejections", "false negative", and "false positive", according to the present invention.

FIG. 3 is a plot, according to the present invention, showing another exemplary Computed Performance Rating vs. the Performance Profile. A pair of axes (x=70, y=75) defines four quadrants, wherein:

Quadrant I contains points representing individuals having a superior Performance Profile and a superior Computed Performance Rating; these individuals should be hired/should have been hired ("hits");

Quadrant II contains points representing individuals that should not be hired/should not have been hired ("correct rejections");

Quadrant III contains points representing individuals having a superior Performance Profile, and that should have been hired, but would not have been hired ("false negative") based on the test results (low Performance Profile);

Quadrant IV contains points representing individuals having a lower-than-required Performance Profile, and should not have been hired, yet would have been hired ("false positive") based on the favorable test results (high Performance Profile).

In this particular study, 46% of the candidates were justifiably accepted, based on the acceptance criteria; 47% of the candidates were justifiably rejected, based on those acceptance criteria; 5% of the candidates were unjustifiably rejected, and 2% of the candidates were unjustifiably accepted.

These exemplary results, achieved using the assessment method of the present invention, are surprisingly good in relation to known techniques. In fact, research of pre-employment screening techniques shows that, in most cases, it is difficult to reach validity levels exceeding 0.5, through the utilization of combinations of all the available techniques. Individual techniques of the prior art typically have validity levels of 0.2-0.3. By sharp contrast, a rigorous analysis of the inventive method, as described hereinabove, indicates validity levels above 0.65 to 0.85 and higher. This breakthrough in the field of candidate assessment will undoubtedly have a significant impact, worldwide, on the way candidates are assessed and selected.

The inventor has found that the predictive validity of the 'linear approach' is low. Human beings have proven to be a repository of intricate traits of varying levels—including some that are not openly perceived.

The method of the present invention takes a 'non-linear approach', by finding the Set of Candidate Rules that creates the best mathematical correlation between the existing employees, and the level of success in the organization of those employees. This approach requires a complex, computerized modeling program for producing such a correlation from a huge number of combinations. Some of the correlations are not intuitively obvious, to the employer and to experts alike.

Figure 4:
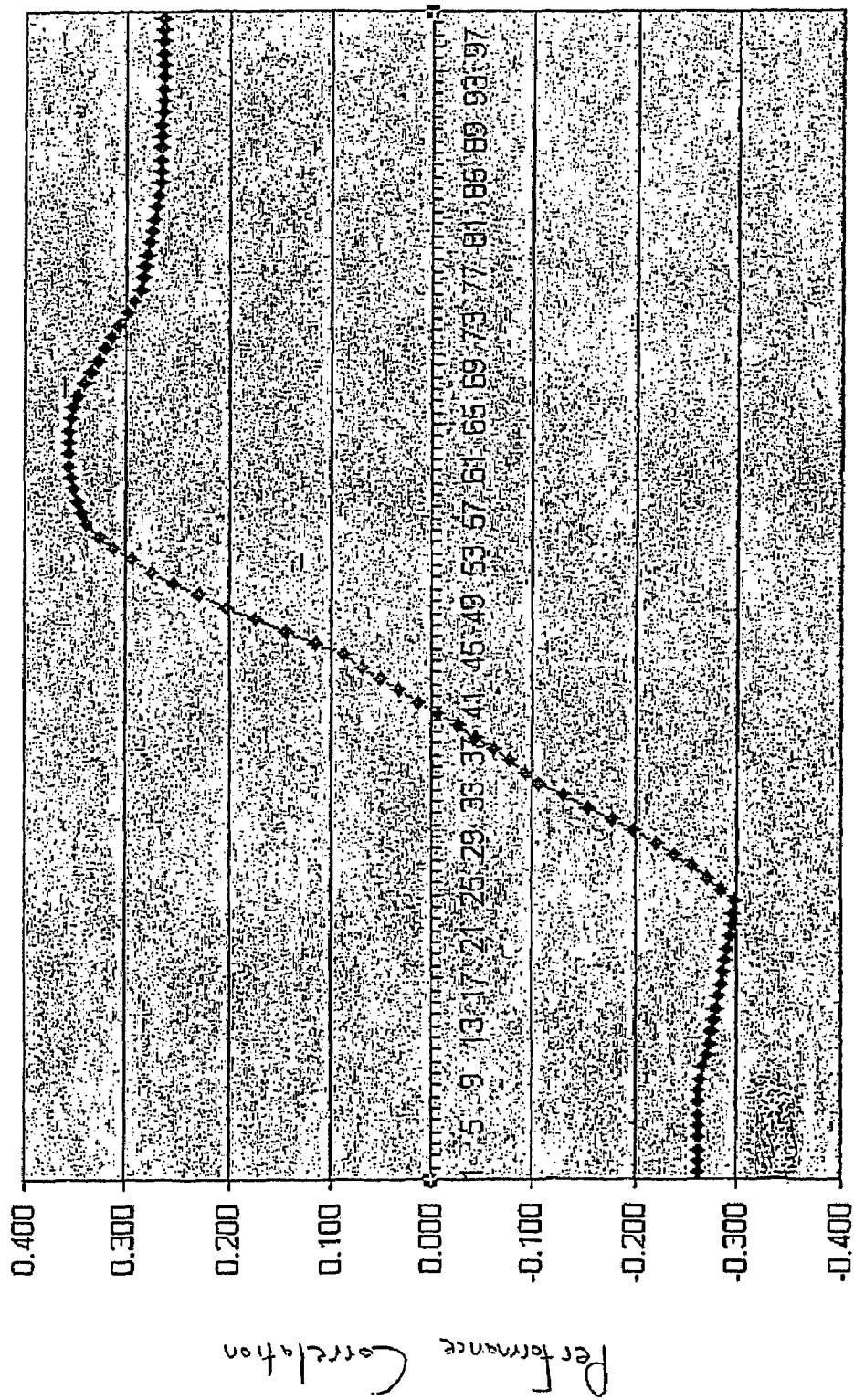
FIG. 4 is an exemplary plot showing a non-linear relationship between a Personal Parameter (friendliness) result and the performance correlation, according to the present invention.

FIG. 4 is an exemplary plot showing such a non-linear relationship, or rule, between a Personal Parameter (friendliness) result and the performance correlation. The correlation achieves a peak, or maximum, at a rating of 63 out of 100. This signifies that friendliness ratings above 63, or below 63 are correlated with decreased worker performance. Below a rating of about 40, the friendliness, or lack thereof, is such that the impact on performance is actually negative.

Thus, it can be seen, that the correlation between rating and performance has both a maximum and a minimum that, for this particular work position, are not at the end points of the rating scale.

Figure 5:
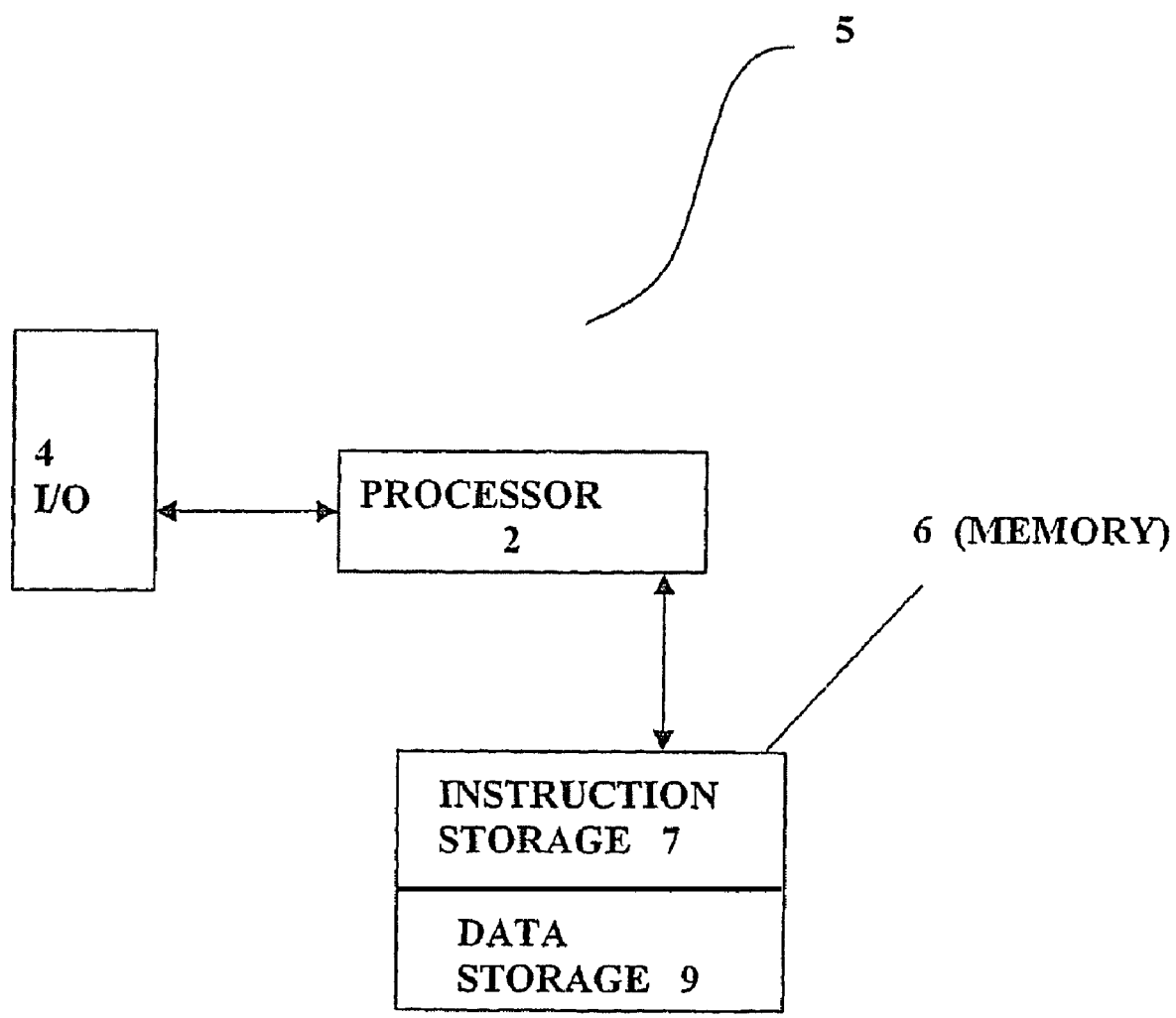
FIG. 5 is a block diagram of a system according to the present invention.

FIG. 5 is a block diagram of a system 5 according to the present invention. System 5 includes a processor 2, a memory 6, and an I/O block 4. Memory 6 includes a data storage area 9 and preferably, an instruction storage area 7 and. This general architecture allows processor 2 to input the Personal Profiles of the existing workers and candidates, and the Performance Profiles of the existing workers, to process the data according to the method of the present invention, according to any and all of the preferred embodiments, and to output the results. The processor may be based on various systems and methods known in the art, including, but not limited to, the system and method disclosed in United States Patent Application Publication No. 20040015335, entitled "Method, system and medium for controlling manufacturing process using adaptive models based on empirical data", which is incorporated by reference for all purposes as if fully set forth herein.

As used herein in the specification and in the claims section that follows, the term "Personal Parameters", and the like, refers to an ability or characteristic of a person, typically an existing employee or a candidate. Examples of Personal Parameters include visual memory, friendliness, stress tolerance, and years of work experience.

As used herein in the specification and in the claims section that follows, the term "Personal Test" refers to a test for examining one or more Personal Parameters. Typical abilities or characteristics that are tested in a Personal Test include various personality traits, analytical abilities, and integrity.

As used herein in the specification and in the claims section that follows, the term "Personal Profile" refers to a rating given to an employee or candidate, following a Personal Test, the rating relating to one or more Personal Parameters.

As used herein in the specification and in the claims section that follows, the term "Dimension of Performance" and the like, refers to a criterion by which an employer measures the performance of an employee, in the job framework the employee is currently performing (examples: productivity, customer service).

As used herein in the specification and in the claims section that follows, the term "Personal Chemistry Dimension" refers to a specific Dimension of Performance relating to a level of cooperative work interaction with a specific individual or specific individuals within a particular work group. For example, if cooperative work interaction with a manager is a criterion by which an employer measures the performance of an employee, a worker who does not get along with his eccentric superior, would receive a low rating for the Personal Chemistry Dimension.

As used herein in the specification and in the claims section that follows, the terms "Employer's Evaluation" and "EVAL" refer to a rating given to each employee, by the employer thereof, the rating reflecting the performance of the employee, with respect to particular Dimensions of Performance, and usually, with respect to a particular job or position.

As used herein in the specification and in the claims section that follows, the term "Performance Profile" refers to a rating given to each employee, the rating reflecting the performance of the employee, with respect to particular performance success criteria. The performance success criteria may include a manager's evaluation and/or actual performance data, e.g., for a salesman, the salesman's $/month of sales.

As used herein in the specification and in the claims section that follows, the term "Position-Specific Performance Profile", and the like, refers to a Performance Profile with respect to a particular job.

As used herein in the specification and in the claims section that follows, the term "Set of Candidate Rules" refers to a set of rules for predicting the suitability (or potential Performance Profile) of a candidate, the rules being determined by processing Performance Profiles and Personal Profiles. A Set of Candidate Rules is usually specific to a particular job, and to a particular organization, and is characterized by high validity levels.

As used herein in the specification and in the claims section that follows, the term "Computed Performance Rating" refers to the rating given to a candidate, based on the Set of Candidate Rules. The Computed Performance Rating is usually specific to a particular job, and to a particular organization.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An assessment method for selecting at least one suitable candidate for a work position using performance data from each worker in a pool of existing workers, the method comprising the steps of:
   (a) inputting into a computer-implemented processing stage, for each worker in the pool of existing workers:
      (i) a Personal Profile relating to a set of Personal Parameters, and
      (ii) a Performance Profile,
   (b) processing said Personal Profile and said Performance Profile of each of the existing workers, to produce a Set of Candidate Rules correlating said Performance Profiles to said Personal Profiles, wherein at least one candidate rule of said Set of Candidate Rules is a non-linear rule;
   (c) obtaining, for at least one candidate, a Personal Profile, and
   (d) analyzing said Personal Profile from said at least one candidate, along with said Set of Candidate Rules, to produce a Computed Performance Rating for said candidate.

2. The method of claim 1, wherein said Performance Profile is a Position-Specific Performance Profile.

3. The method of claim 2, wherein said Position-Specific Performance Profile is based on the pool of the existing workers, wherein a number of the existing workers in the pool is at least 20.

4. The method of claim 3, wherein said number of the existing workers in the pool is at least 30.

5. The method of claim 3, wherein said number of the existing workers in the pool is at least 40.

6. The method of claim 2, wherein said at least one candidate is a plurality of candidates, the method further comprising the step of:
   (e) ranking said plurality of candidates according to each respective Computed Performance Rating of said candidates, and wherein said Set of Candidate Rules is based on said Position-Specific Performance Profile.

7. The method of claim 1, wherein said Performance Profile is based on the pool of the existing workers, wherein a number of the existing workers in the pool is at least 20.

8. The method of claim 1, further comprising the step of:
(e) comparing said Computed Performance Rating for said candidate with said Performance Profile for each worker in the pool of existing workers.

9. The method of claim 8, further comprising the step of:
(f) determining a closest match between a particular candidate and a particular worker of said existing workers in the pool, based on step (e).

10. The method of claim 1, wherein said Personal Profile for said at least one candidate is a subset of said Personal Profile for each worker in the pool.

11. The method of claim 1, wherein said set of Personal Parameters for said at least one candidate is obtained by reducing said set of Personal Parameters for each worker in the pool, based on said Set of Candidate Rules.

12. The method of claim 1, further comprising:
(e) eliminating at least one parameter from said set of Personal Parameters for each worker, based on said Set Of Candidate Rules, to produce a streamlined set of Personal Parameters, and at least one eliminated parameter, and
(f) testing said at least one candidate using test parameters from said set of Personal Parameters for each worker, said test parameters solely including said streamlined set.

13. The method of claim 1, wherein said processing is reduced by inputting at least one rule of a human expert.

14. The method of claim 1, further comprising:
(e) performing an Employer's Evaluation for each said existing workers in the pool, according to pre-determined criteria, to produce said Performance Profile for each said existing workers.

15. The method of claim 1, wherein said existing workers occupy a plurality of work positions, said Performance Profile is a plurality of Position-Specific Performance Profiles, and said Set of Candidate Rules is a plurality of Sets of Candidate Rules, each Set of said Sets relating to a particular work position of said work positions.

16. The method of claim 15, wherein said Computed Performance Rating for said candidate is a plurality of Computed Performance Ratings, each of said plurality of Computed Performance Ratings being derived from one Set of said Sets.

17. The method of claim 1, wherein said candidate is one of said existing workers in the pool.

18. The method of claim 1, wherein said Performance Profile includes a rating for a Personal Chemistry Dimension.

19. A system for selecting at least one suitable candidate for a work position using performance data from each worker in a pool of existing workers, the system comprising:
(a) a processor;
(b) a memory, associated with said processor, said memory including a data storage area, and
(c) an input/output unit, operatively connected to said processor,
wherein said processor, said memory, and said input/output unit are configured to:
(i) input into a computer-implemented processing stage, for each worker in the pool of existing workers:
(A) a Personal Profile relating to a set of Personal Parameters, and
(B) a Performance Profile,
(ii) process said Personal Profile and said Performance Profile of each of the existing workers, to produce a Set of Candidate Rules correlating said Performance Profiles to said Personal Profiles, wherein at least one candidate rule of said Set of Candidate Rules is a non-linear rule;
(iii) obtain, for at least one candidate, a Personal Profile, and
(iv) analyze said Personal Profile from said at least one candidate, along with said Set of Candidate Rules, to produce a Computed Performance Rating for said candidate.

20. The system of claim 19, wherein said Performance Profile is a Position-Specific Performance Profile.

* * * * *